March 9, 1965  D. GIGNOUX  3,173,033
OBLIQUE FIELD ELECTROSTATIC GENERATOR
Filed May 8, 1962  3 Sheets-Sheet 1

INVENTOR
DOMINIQUE GIGNOUX
BY John Gibson Semmes
ATTORNEY

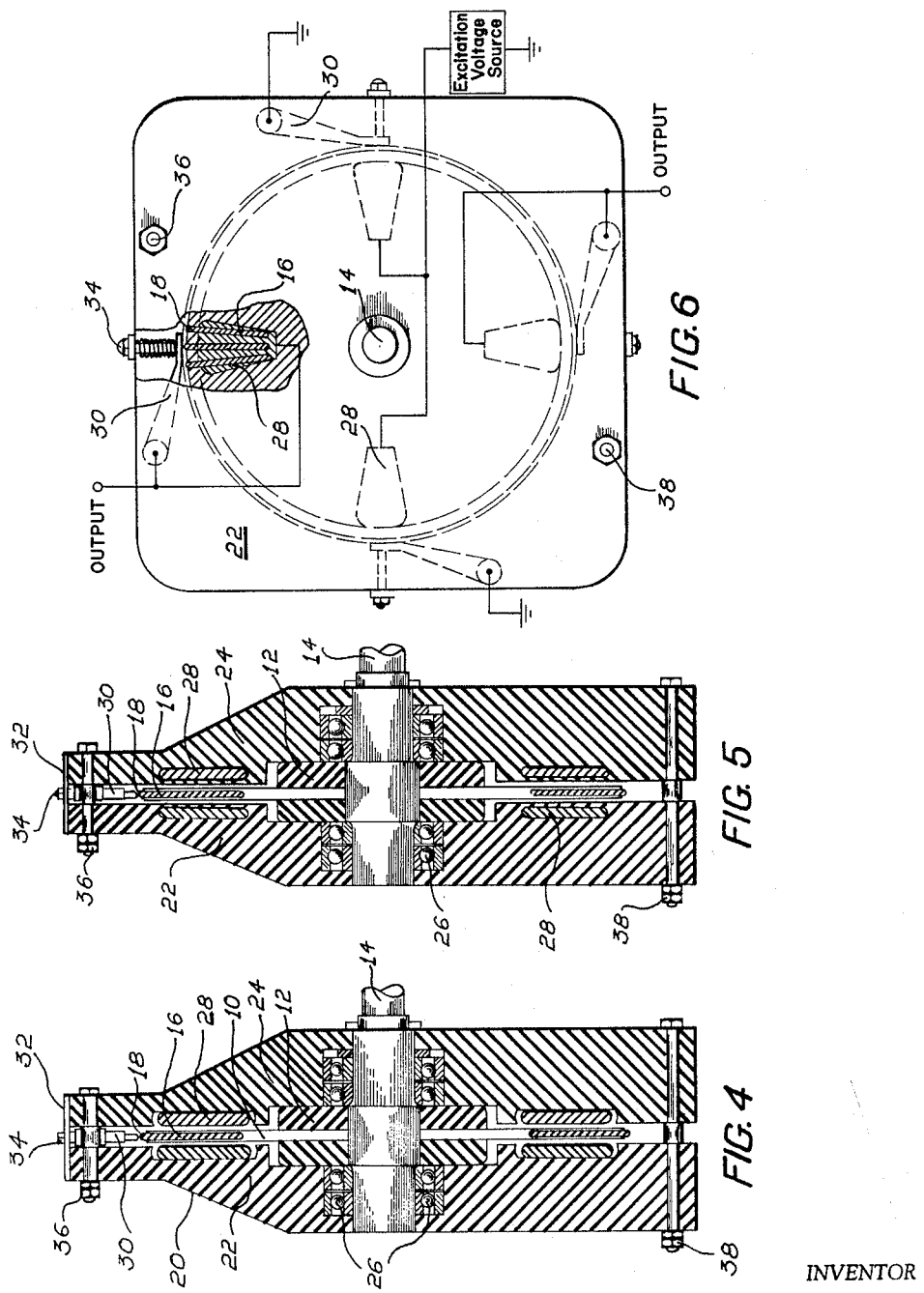

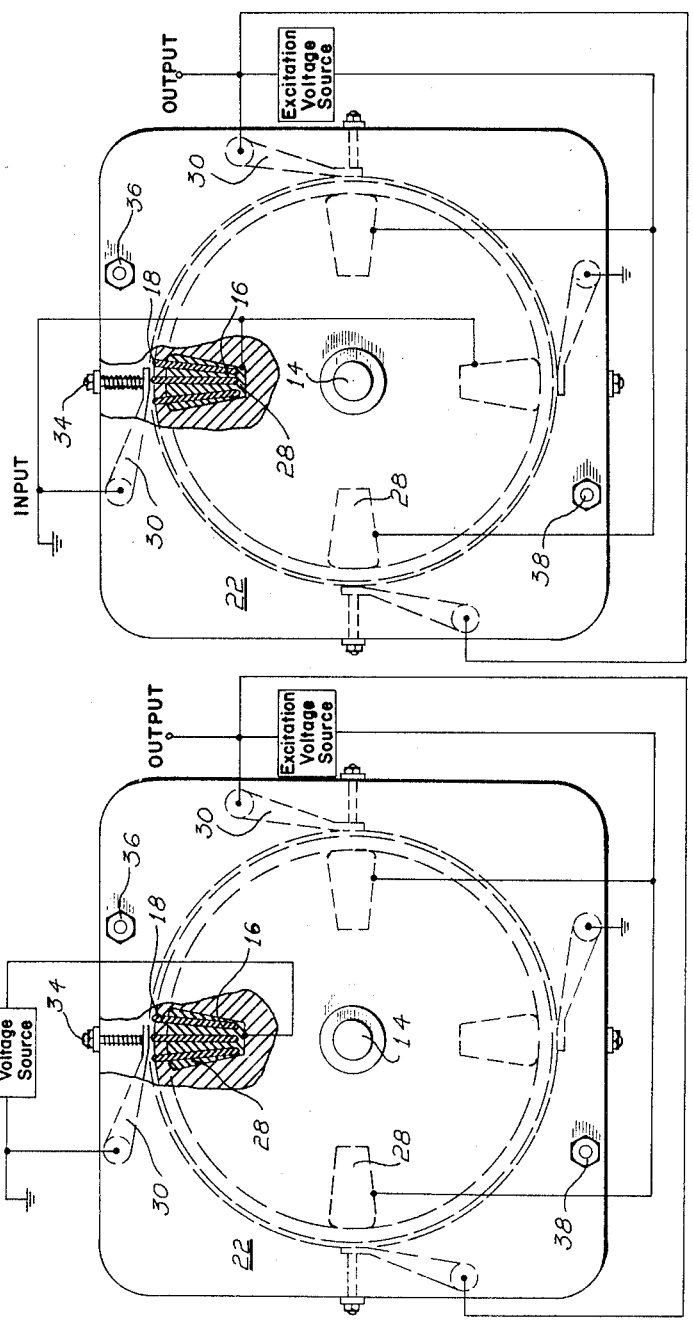

United States Patent Office 3,173,033
Patented Mar. 9, 1965

3,173,033
OBLIQUE FIELD ELECTROSTATIC GENERATOR
Dominique Gignoux, Washington, D.C., assignor to Cosmic, Inc., Washington, D.C., a corporation of Delaware
Filed May 8, 1962, Ser. No. 193,261
3 Claims. (Cl. 310—6)

The present invention relates to an oblique field electrostatic generator of the rotor disc type, having a compact size and efficiency which promise its utility as a power supply for vehicles used in the exploration of outer space and more particularly as power supply for electric propulsion devices.

It has been found that conventional generators do not fully utilize the rotor and stator gap. For instance, in a variable capacitor type of generator, also known as a parametric generator, the electrostatic forces are exerted in a direction perpendicular to the rotor electrode surface. The electrostatic pressure, due to these forces on the surface of the rotor, is therefore, active in producing energy onlyinsofar as it applies to the leading edges of the rotor elements. The forces acting on the sides of the rotor elements, which constitute the major part of the electrostatic pressure, are moving perpendicularly to the direction of movement of the rotor and are therefore not useful. As advanced in applicant's study entitled "Electrostatic Generators in Space Power Systems" (Progress in Astronautics and Rocketry, vol. 3, Academic Press, 1961), no energy is produced on the faces of a rotor segment which is parallel to the stator. The best type of generator, therefore, would be one in which not only those surfaces perpendicular to the direction of motion but those parallel to the direction of motion are subjected to an active force. This requires that the field be oblique and not perpendicular to the surface. This obliquity can only be achieved if the rotor or stator surface or both are made of a non-conducting material. In previous generators only a minute portion of the rotor surface is the subject of active forces. In the present invention most of the rotor surface is utilized in the production of electrical energy. A much lighter power to weight ratio can therefore be obtained which is advantageous particularly for power systems usable in outer space. The present invention, therefore, is addressed to the employment of rotor charge carriers which are diminutive in size, yet maintain maximum constant oblique field.

According to the present invention, the rotor charge carriers are radially embedded in a rotor disc of insulating material, having the ends of the charge carriers clear of the insulating material for commutation purposes. Plate-like stator members are mounted on either side of the rotor disc and embody input and output inductors closely positioned adjacent the rotor disc. According to one modification of the invention, the inductors are actually embedded within a semi-conducting material. The embedding or enrobing of the charge carriers within the rotor disc permits a higher field in the solid dielectric rotor disc and a higher capacity of the charge carrier with respect to the inductors, thereby resulting in a higher charge.

A further advantage resides in utilizing a rotor disc having a high dielectric constant together with a gap between rotor and stator, as small as possible. For, the narrower the gap and the greater the dielectric constant, the greater is the capacitance of the charge carriers with respect to the inductors. As is well known, the greater the capacitance of the charge carriers, the greater the charge which can be generated.

Accordingly, it is an object of invention to provide compact means for creating a constantly oblique field.

Another object of invention is to provide means for permitting the induction of a higher field in a solid dielectric.

Another object of invention is to enhance the capacity of the charge carrier.

Yet additional objects of invention will become apparent from the ensuing specification and attached drawings wherein:

FIG. 4 is a vertical section of the proposed generator FIG. 1 construction, showing the rotor disc 10 mounted between the opposed stator plates;

FIG. 5 is a vertical section of a modified form of stator according to the FIG. 2 construction wherein the inductors are embedded in a semi-conducting material;

Figure 1:
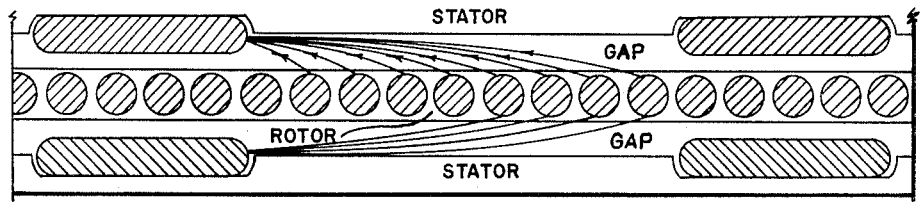
FIG. 1 is a fragmentary cross-sectional view of a disc rotor and stator showing lines of force.
Figure 2:
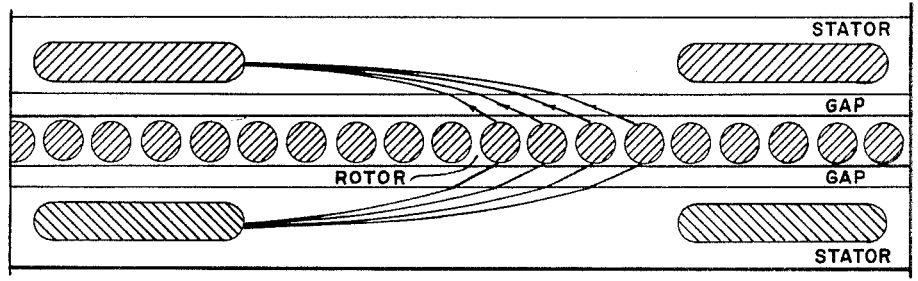
FIG. 2 is a modification of the stator of FIG. 1 wherein the inductor is embedded in a semi-conducting material and also showing the lines of force.
Figure 3:
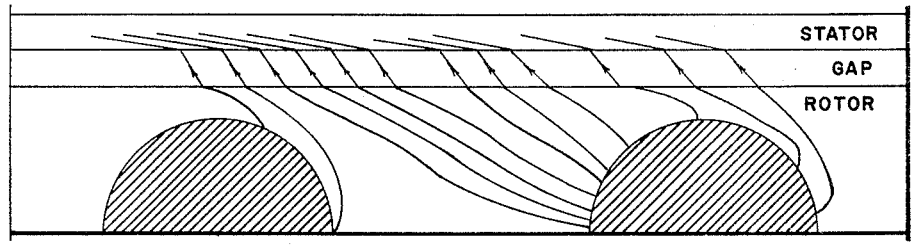
FIG. 3 is an enlarged schematic based on FIG. 2 showing the expected arrangement of lines of force around two charge carriers.
Figure 8:
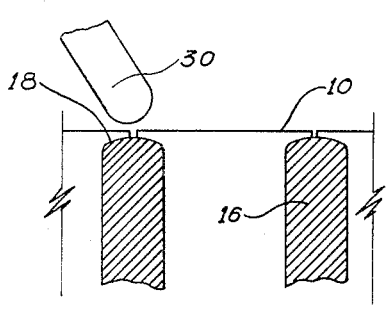
Figure 7:
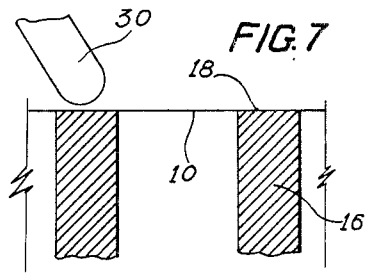

FIG. 6 is a side elevation of a proposed 4 pole construction with a fragmentary section showing the individual charge carriers with their outer ends 18 protruding beyond the periphery of rotor disc 10;

FIG. 7 is an enlarged and fragmentary cross-section of a modified rotor wherein the individual charge carrier ends 18 are flush with the rotor disc periphery yet clear of the solid dielectric;

FIG. 8 is an enlarged and fragmentary cross-section of yet another modification wherein the charge carrier ends 18 are inset with respect to the rotor disc periphery, albeit with a portion of end 18 clear of the solid dielectric;

FIG. 9 is a side elevation of a modified construction wherein high voltage excitation means are connected to both input and output inductors; and FIG. 10 is a side elevation of yet another modification wherein the high voltage excitation means are connected to the output inductors.

In FIGS. 4 and 5 rotor 10 is shown as comprised of a disc of electrical insulating material mounted by bushings 12 upon rotatable shaft 14 which is seated within the stator plate bearings 26. Individual charge carrier members 16 are radially embedded in disc 10, yet protrude slightly as at 18 beyond the periphery of disc 10. Charge carriers 16 are rod-like, uniformly spaced and are made of a conducting material. Their protruding end portions 18 form the commutator. However, protrusion of the charge carrier end 18 is not necessary. It is sufficient for purposes of the present invention that only a portion of the end be clear of insulating material so as to permit commutation. For example, the charge carrier end portions 18 may be flush with the rotor disc periphery as illustrated in FIG. 7 or may be inset with respect thereto as illustrated in FIG. 8, so long as a portion of the charge carrier cross section is exposed for commutation purposes.

Stator 20 is constructed of opposed plates 22 and 24 of electrical insulating material, machined to accommodate shaft 14 and bearings 26. Secured to the stator are input and output inductors 28 which are made of a conducting material. In the FIG. 5 modification inductors 28 are embedded in a semi-conducting material which covers the front face of the inductor or face adjacent the rotor. The back side of the inductor is covered with the same semi-conducting material to simplify construction. However, the back side could be equally effectively covered with a completely insulating material. Brushes 30 are mounted on the stator framework 32 by bolt or like means 34 and are located adjacent each set of inductors. By setting brushes 30 apart from charge carrier ends 18 a certain amount of frictional wear may be avoided. The gap between the disc rotor 10 and the inductors is as small as possible in order that the excitation voltage might be reduced. Provision may be made to allow the use of two excitation sources for the inductors, one for the input inductors and the other for the output inductors. The stator plates 22 and 24 may be adjustably secured apart from one another by threaded bolts 36 and 38 or like means.

In the construction shown in FIG. 5, inductors 28 are embedded in a semi-conducting material in order to limit variations of the tangential field and to stop arc discharges which might start. The use of the semi-conducting stator between input and output inductors insures a regular distribution of voltage and, therefore, of the tangential field preventing breakdown. It is also useful in limiting the parasitic normal field due to rapid variations of the tangential field. An approximation of the desired result could be obtained by mounting a resistor bridge or chain of high resistors between the inductors, and having a stator made of conducting plates at decreasing potentials determined by the resistor bridge. This result is achieved, for instance, in the Van de Graaff machines by placing along the belt a series of rings connected to one another by means of resistors.

The semi-conductor may be glass with added impurities, and its resistivity will be kept such that the current drain will be only a very small part of the output current, for example on the order of $10^{11}$ ohms-cm./cm.$^2$. A very interesting feature of the constant oblique field design is that most of the surface materials subjected to high electrical fields are insulating materials. For instance, the field between rotor and stator will not exert an action directly on any metallic members, but only on an insulating surface. Although, the technical literature does not provide data on the exact dielectric strength of a gap between insulating and semi-conducting materials, the inventor has found that the use of such materials brings a direct and substantial improvement in dielectric strength of the gaps and thereby in generator performance.

As will be apparent, modification in the dimensions of parts may be employed, both stator and charge carrier elements may be repositioned and various types of stator and rotor materials may be employed without departing from the spirit and scope of invention, as defined in the subjoined claims.

I claim:

1. An oblique field electrostatic generator comprising:
   (a) a stator of electrical insulating material with input and output inductors supported thereon;
   (b) a rotor disc of electrical insulating material revolvedly supported in parallel with said stator;
   (c) rod-like rotor charge carrier members in greater number than said inductors imbedded in said rotor disc and extending radially therein so as to comprise most of the rotor surface, a portion of the outer ends of said charge carrier members being clear of said insulating material, the combined total surfaces of said rod-like charge carriers exposed to said stator being greater than the total surface of each of said inductors within said stator;
   (d) high voltage excitation means connected to said input inductors;
   (e) means revolving said rotor disc relatively to said stators; and
   (f) commutator means supported in proximity to said charge carrier members.

2. An oblique field electrostatic generator comprising:
   (a) a stator of insulating material having slight conductivity having opposed separated plates with inductors supported on the inner opposed faces of said plates;
   (b) a rotor disc of electrical insulating material revolvedly supported between said plates;
   (c) rod-like rotor charge carrier members in greater number than said inductors imbedded in said rotor disc and extending radially therein so as to comprise most of the rotor surface, a portion of the outer ends of said charge carrier members being clear of said disc, the combined total surfaces of said rod-like charge carriers exposed to said stator being greater than the total surface of each of said inductors within said stator;
   (d) high-voltage excitation means connected to at least one of said inductors;
   (e) means revolving said rotor disc relatively to said stator; and
   (f) commutator means supported in proximity to said charge carrier members and including ground brushes and output brushes positioned in proximity to said radially extending ends of said charge carrier members.

3. An oblique field electrostatic generator as in claim 2, said inductors being supported on said separated plates so that they are imbedded in the insulating material.

References Cited by the Examiner
UNITED STATES PATENTS

| | | | |
|---|---|---|---|
| 2,009,503 | 7/35 | Landwerlin | 310—6 |
| 2,542,494 | 2/51 | Felici | 310—6 |
| 2,610,994 | 9/52 | Bosch et al. | 310—6 |
| 2,739,248 | 3/56 | Meier | 310—6 |
| 2,806,158 | 9/57 | Emery et al. | 310—268 |
| 3,094,653 | 6/63 | Le May | 310—6 |

MILTON O. HIRSHFIELD, *Primary Examiner.*